US012042945B2

(12) United States Patent
Stramandinoli et al.

(10) Patent No.: US 12,042,945 B2
(45) Date of Patent: Jul. 23, 2024

(54) SYSTEM AND METHOD FOR EARLY EVENT DETECTION USING GENERATIVE AND DISCRIMINATIVE MACHINE LEARNING MODELS

(71) Applicant: Carrier Corporation, Palm Beach Gardens, FL (US)

(72) Inventors: Francesca Stramandinoli, West Hartford, CT (US); Edgar A. Bernal, Webster, NY (US); Binu M. Nair, Berkeley, CA (US); Richard W. Osborne, Stafford Springs, CT (US); Ankit Tiwari, Natick, MA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 151 days.

(21) Appl. No.: 17/254,073

(22) PCT Filed: Jul. 30, 2020

(86) PCT No.: PCT/US2020/044203
§ 371 (c)(1),
(2) Date: Dec. 18, 2020

(87) PCT Pub. No.: WO2021/040958
PCT Pub. Date: Mar. 4, 2021

(65) Prior Publication Data
US 2022/0297304 A1  Sep. 22, 2022

Related U.S. Application Data

(60) Provisional application No. 62/890,897, filed on Aug. 23, 2019, provisional application No. 62/904,139, filed on Sep. 23, 2019.

(51) Int. Cl.
*B25J 9/16* (2006.01)

(52) U.S. Cl.
CPC .......... *B25J 9/1697* (2013.01); *B25J 9/1661* (2013.01); *B25J 9/1676* (2013.01); *G05B 2219/39001* (2013.01)

(58) Field of Classification Search
CPC ...... B25J 9/1697; B25J 9/1661; B25J 9/1676; B25J 9/163; G05B 2219/39001;
(Continued)

(56) References Cited

U.S. PATENT DOCUMENTS

2017/0087722 A1   3/2017   Aberg et al.
2019/0105779 A1   4/2019   Einav
(Continued)

FOREIGN PATENT DOCUMENTS

CN      106678962 A     5/2017
CN      107097227 A     8/2017
(Continued)

OTHER PUBLICATIONS

Yangming Li, et al., "A Novel Recurrent Neural Network for Improving Redundant Manipulator Motion Planning Completeness," IEEE Int Conf Robot Autom. May 2018 ; 2018: 2956-2961 (Year: 2018).*
(Continued)

*Primary Examiner* — Steven W Crabb
(74) *Attorney, Agent, or Firm* — CANTOR COLBURN LLP

(57) ABSTRACT

A method for human-robot collaboration including: acquiring visual temporal data of a human partner to a robot; determining, using a generative module, predicted future visual temporal data in response to the visual temporal data, the visual temporal data including current visual temporal data and previous visual temporal data; and determining, using a discriminative module, a vector of probabilities indicating the likelihood that a future action of the human (Continued)

partner belongs to each class among a set of classes being considered in response to at least the future visual temporal data and the visual temporal data.

15 Claims, 4 Drawing Sheets

(58) Field of Classification Search
CPC .......... G05B 2219/39271; G05B 2219/40202; G05B 2219/40411; G06N 3/044; G06N 3/045; G06N 3/047; G06N 7/01; G06N 20/00
See application file for complete search history.

(56) References Cited

U.S. PATENT DOCUMENTS

| | | | |
|---|---|---|---|
| 2019/0143517 | A1 | 5/2019 | Yang et al. |
| 2020/0320233 | A1* | 10/2020 | Naderhirn ............... G06F 30/20 |

FOREIGN PATENT DOCUMENTS

| | | |
|---|---|---|
| CN | 108954535 A | 12/2018 |
| EP | 1754946 A2 | 2/2007 |
| EP | 2672191 A1 | 12/2013 |
| EP | 2587173 B1 | 5/2015 |
| EP | 3399251 A1 | 11/2018 |
| KR | 20010001916 A | 1/2001 |
| KR | 200398415 Y1 | 10/2005 |

OTHER PUBLICATIONS

Hongyi Liu, et al., "Human motion prediction for human-robot collaboration," Journal of Manufacturing Systems 44 (2017) 287-294 (Year: 2017).*

M. Sigalas, H. Baltzakis and P. Trahanias, "Gesture recognition based on arm tracking for human-robot interaction," 2010 IEEE/RSJ International Conference on Intelligent Robots and Systems, Taipei, Taiwan, 2010, pp. 5424-5429 (Year: 2010).*

Abstract of CN107097227A, 2 pgs.

Ben Amor Heni et al., "Interaction primitives for human-robot cooperation tasks", 2014 IEEE International Conference on Robotics and Automation (ICRA), IEEE, May 31, 2014, 7 pages.

International Search Report for International Application No. PCT/US2020/044203 dated Oct. 30, 2020, 6 pages.

Mainprice Jim et al., "Human-robot collaborative manipulation planning using early prediction of human motion", 2013 IEEE/RSJ International Conference on Intelligent Robots and Systems, (ROS), IEEE, Nov. 3, 2013, 8 pages.

Written Opinion of the International Searching Authority for International Application No. PCT/US2020/044203 dated Oct. 30, 2020, 13 pages.

* cited by examiner

SYSTEM AND METHOD FOR EARLY EVENT DETECTION USING GENERATIVE AND DISCRIMINATIVE MACHINE LEARNING MODELS

CROSS REFERENCE TO RELATED APPLICATIONS

This application claims the benefit of U.S. Application No. 62/890,897, filed on Aug. 23, 2019, and U.S. Application No. 62/904,139, filed on Sep. 23, 2019 which is incorporated herein by reference in its entirety.

BACKGROUND

The subject matter disclosed herein generally relates to the field of robotics, and more particularly to a method and apparatus for human-robot collaboration.

In the manufacturing domain there are tasks that require human labor (e.g., wire harness, electronic or aircraft assembly, composite fabrication, etc.). Some of these tasks can be tedious or strenuous for a human to perform. Many of these tasks are difficult and in some cases, too expensive to fully automate due to advanced dexterity and flexibility requirements, yet increases in production volume and cost remain challenging for manufacturers.

BRIEF SUMMARY

According to one embodiment, a method for human-robot collaboration is provided. The method including: acquiring visual temporal data of a human partner to a robot; determining, using a generative module, predicted future visual temporal data in response to the visual temporal data, the visual temporal data including current visual temporal data and previous visual temporal data; and determining, using a discriminative module, a vector of probabilities indicating the likelihood that a future action of the human partner belongs to each class among a set of classes being considered in response to at least the future visual temporal data and the visual temporal data.

In addition to one or more of the features described above, or as an alternative, further embodiments may include determining, using a transition enforcement module, a predicted class of the set of classes by combining the vector of probabilities and a transition matrix, the transition matrix containing conditional probabilities of the future action of the human partner taking place based upon the visual temporal data.

In addition to one or more of the features described above, or as an alternative, further embodiments may include determining, using a robot planning module, a robot action that best suits the visual temporal data and the predicted class.

In addition to one or more of the features described above, or as an alternative, further embodiments may include actuating the robot in accordance with the robot action.

In addition to one or more of the features described above, or as an alternative, further embodiments may include capturing, using a data acquisition module, visual temporal data.

In addition to one or more of the features described above, or as an alternative, further embodiments may include that the visual temporal data includes at least one of a Red-Green-Blue video, an infrared video, a near-infrared video, and depth map sequences.

In addition to one or more of the features described above, or as an alternative, further embodiments may include that the data acquisition module includes at least one of an external depth sensor and a Red-Green-Blue sensor.

In addition to one or more of the features described above, or as an alternative, further embodiments may include modifying, using a predictive module, the visual temporal data by concatenating the predicted future visual temporal data to the visual temporal data, and inputting the visual temporal data that has been modified by the predictive module to the discriminative module.

According to another embodiment, an apparatus for human-robot collaboration is provided. The apparatus including: a controller including: a processor; and a memory including computer-executable instructions that, when executed by the processor, cause the processor to perform operations. The operations including: acquiring visual temporal data of a human partner to a robot; determining, using a generative module, predicted future visual temporal data in response to the visual temporal data, the visual temporal data including current visual temporal data and previous visual temporal data; and determining, using a discriminative module, a vector of probabilities indicating the likelihood that a future action of the human partner belongs to each class among a set of classes being considered in response to at least the future visual temporal data and the visual temporal data.

In addition to one or more of the features described above, or as an alternative, further embodiments may include that the operations further include: determining, using a transition enforcement module, a predicted class of the set of classes by combining the vector of probabilities and a transition matrix, the transition matrix containing conditional probabilities of the future action of the human partner taking place based upon the visual temporal data.

In addition to one or more of the features described above, or as an alternative, further embodiments may include that the operations further include: determining, using a robot planning module, a robot action that best suits the visual temporal data and the predicted class.

In addition to one or more of the features described above, or as an alternative, further embodiments may include that the operations further include actuating the robot in accordance with the robot action.

In addition to one or more of the features described above, or as an alternative, further embodiments may include a data acquisition module configured to capture the visual temporal data.

In addition to one or more of the features described above, or as an alternative, further embodiments may include that the visual temporal data includes at least one of a Red-Green-Blue video, an infrared video, a near-infrared video, and depth map sequences.

In addition to one or more of the features described above, or as an alternative, further embodiments may include that the data acquisition module includes at least one of an external depth sensor and a Red-Green-Blue sensor.

In addition to one or more of the features described above, or as an alternative, further embodiments may include that the operations further include: modifying, using a predictive module, the visual temporal data by concatenating the predicted future visual temporal data to the visual temporal data, and inputting the visual temporal data that has been modified by the predictive module to the discriminative module.

According to another embodiment, a computer program product embodied on a non-transitory computer readable medium is provided. The computer program product including instructions that, when executed by a processor, cause the processor to perform operations including: acquiring visual temporal data of a human partner to a robot; determining, using a generative module, predicted future visual temporal data in response to the visual temporal data, the visual temporal data including current visual temporal data and previous visual temporal data; and determining, using a discriminative module, a vector of probabilities indicating the likelihood that a future action of the human partner belongs to each class among a set of classes being considered in response to at least the future visual temporal data and the visual temporal data.

In addition to one or more of the features described above, or as an alternative, further embodiments may include that the operations further include: determining, using a transition enforcement module, a predicted class of the set of classes by combining the vector of probabilities and a transition matrix, the transition matrix containing conditional probabilities of the future action of the human partner taking place based upon the visual temporal data.

In addition to one or more of the features described above, or as an alternative, further embodiments may include that the operations further include: determining, using a robot planning module, a robot action that best suits the visual temporal data and the predicted class.

In addition to one or more of the features described above, or as an alternative, further embodiments may include that the operations further include actuating the robot in accordance with the robot action.

Technical effects of embodiments of the present disclosure include tracking human movement, predicting future human movements, and utilizing a robot to aid in the future human movement.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
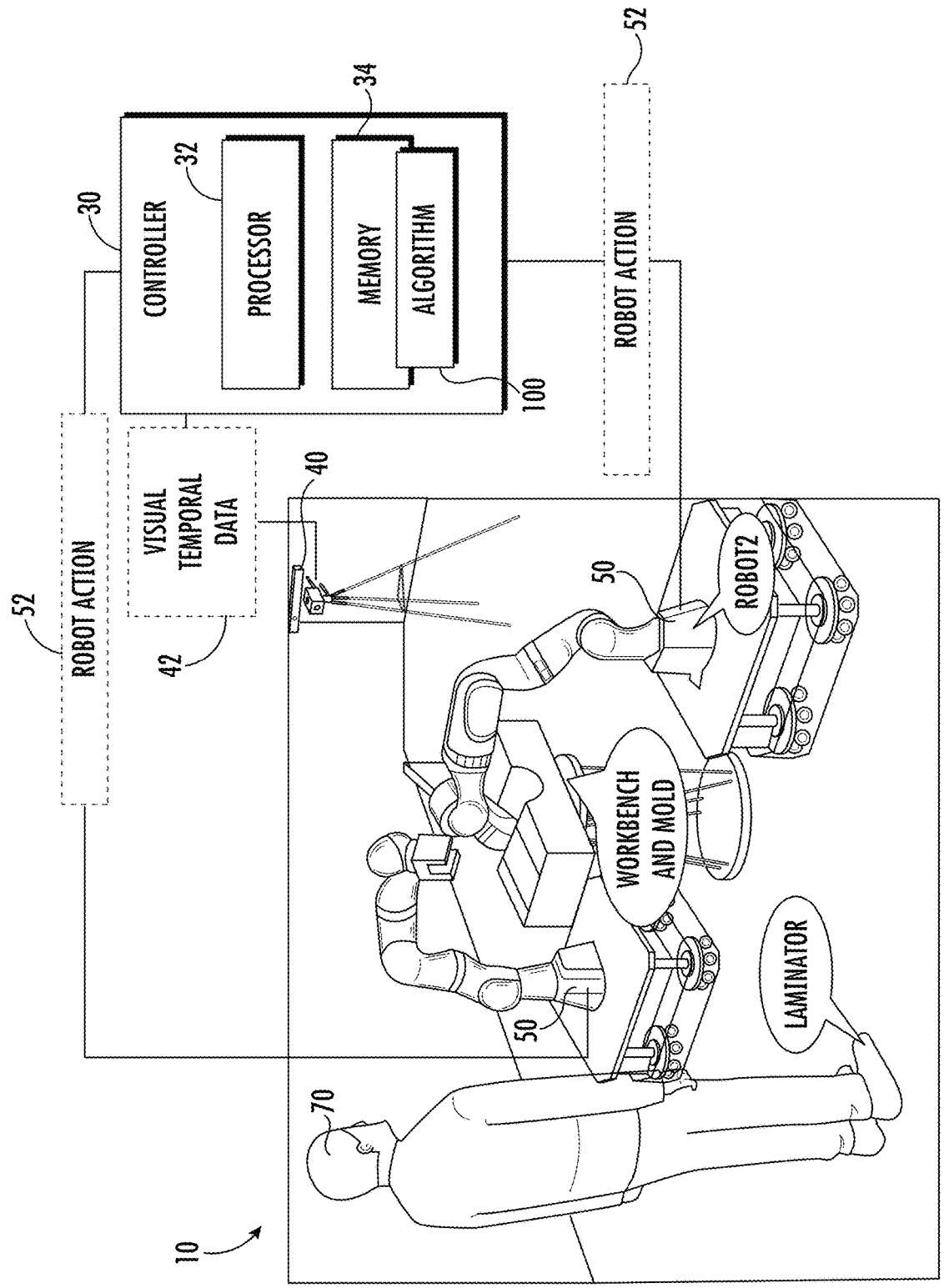
FIG. 1 is an apparatus for human-robot collaboration, in accordance with an embodiment of the disclosure.

Referring now to FIG. 1, an apparatus 10 for human-robot collaboration is illustrated, in accordance with an embodiment of the disclosure. The apparatus 10 includes a controller 30, a data acquisition module 40, and a robot 50. It should be appreciated that, although only one data acquisition module 40 is illustrated, one or more data acquisition modules 40 may be utilized in embodiments of the present disclosure. It should be appreciated that, although only two robots 50 are illustrated, one or more robots 50 may be utilized embodiments of the present disclosure. It should be appreciated that, although particular systems are separately defined in the schematic block diagrams, each or any of the systems may be otherwise combined or separated via hardware and/or software.

The robot 50 may be a robotic arm as illustrated in FIG. 1 or any robot known to one of skill in the art. The robot 50 is in electronic communication with the controller 30. The electronic communication may be wired and/or wireless. The robot 50 may be a collaborative robot (i.e., cobot) that is different from traditional industrial robotic arms. Collaborative robots are designed and built for close collaboration with human partners. Collaborative robots such as Cobots are power and force limited so that Cobots are safe by design to work alongside humans without any additional safely devices. The robot 50 may assist the human partner 70 in performing a variety of manual labor tasks to achieve a common goal. Manual labor tasks may include but are not limited to wire harness fabrication, electronic aircraft assembly, composite fabrication, or any manual labor task known to one of skill in the art. Human-robot collaboration towards achieving a common goal is most effective when the robot has the capability to estimate the intentions and needs of its human partner 70, and to plan complementary actions accordingly. The earlier the robot 70 can anticipate the actions performed by its human partner 70, the safer and more seamless the interaction between the robot 50 and the human partner 70 will be. The embodiments disclosed herein provide an apparatus and method to aid to the robot 50 being able to anticipate the human partner 70.

The data acquisition module 40 is configured to capture visual temporal data 42. Visual temporal data 42 may include, but is not limited to, Red-Green-Blue (RGB) video, infrared (IR) video, near-infrared (NIR) video, depth map sequences, or similar Visual temporal data 42 known to one of skill in the art. In an embodiment, visual temporal data comprises at least one of RGB video, IR video, NIR video, and depth map sequences. In one embodiment data acquisition module 40 includes at least one of an external depth sensor and an RCSB sensor. The data acquisition module 40 is in electronic communication with the controllers 30. The electronic communication may be wired and/or wireless. The data acquisition module 40 is configured to transmit visual temporal data 42 to the controller 30. The controller 30 is configured to analyze the visual temporal data 42 (including current and previous visual temporal data 42), determine a robot action 52 for the robot 50, and transmit the robot action 52 to the robot 50. The visual temporal data 42 may include current (i.e., real time visual temporal data 42) visual temporal data 42 and previous (i.e., past) visual temporal data 42, The robot 50 may be actuated in response to the robot action 52. The action of the robot 50 may perform a designated task.

The controller 30 may be an electronic controller including a processor 32 and an associated memory 34 comprising computer-executable instructions that, when executed by the processor 32, cause the processor to perform various operations. The processor 32 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 34 may be but is not limited to a random access memory (RAM), read only memory (ROM), or other electronic, optical, magnetic or any other computer readable medium. The computer-executable instructions may include an algorithm 100 for human-robot collaboration discussed further herein in relation to FIG. 2.

Figure 2:
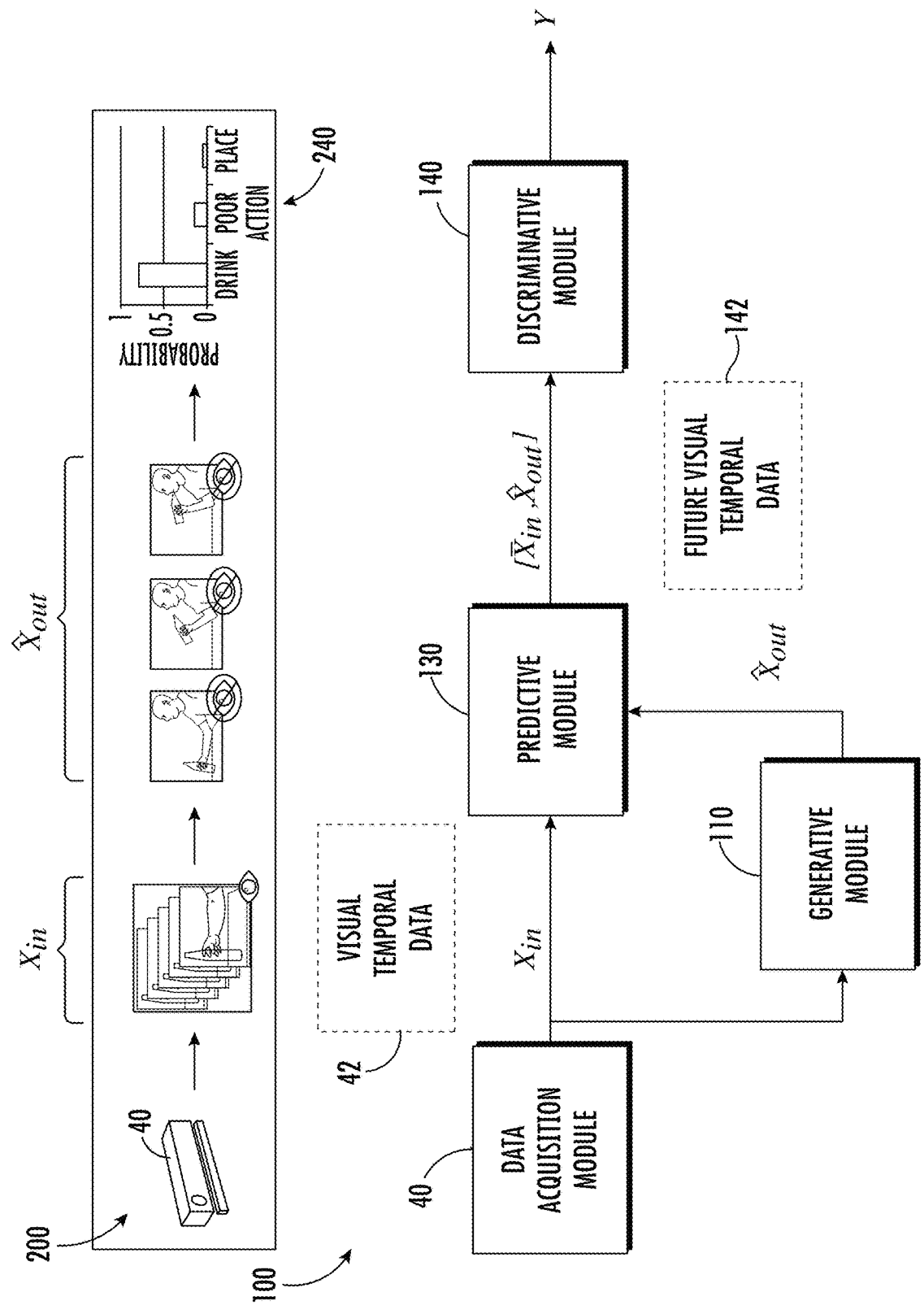
FIG. 2 is an algorithm for human-robot collaboration, in accordance with an embodiment of the disclosure.

Referring now to FIG. 2, with continued reference to FIG. 1, the algorithm 100 for human-robot collaboration is illustrated, in accordance with an embodiment of the disclosure. An example 200 of predictive analysis that may be performed in real time by the algorithm 100 is also illustrated in FIG. 2. The example 200 relates to a prediction of what a human partner 70 may do when reaching for a bottle 72. The prediction of what a human partner 70 may do when reaching for a bottle 72 may fall into one or more classes 240 of possible actions. The classes 240 of possible actions may include, but are not limited to "drink", "pour", and "place".

The algorithm 100 leverages a sequence of features extracted from visual temporal data 42 from the data acquisition module 40. The algorithm 100 includes a generative module 110, a predictive module 130, and a discriminative module 140. The generative module 110, the predictive module 130, and the discriminative module 140 may each be trained computer models. It should be appreciated that, although particular systems are separately defined in the schematic block diagrams, each or any of the systems may be otherwise combined or separated via hardware and/or software.

The algorithm 100 collects visual temporal data 42 at a selected frequency, such as, for example 30 fps. The visual temporal data 42 may provide skeletal joint information. For example, the generative module 110 and the predictive module 130 may be trained using 3D locations of upper body joints including, but not limited to, neck, head, left shoulder, left elbow, left hand, right shoulder, right elbow, and right hand. In one example, extracting the 3D coordinates of these joints may result in a vector of length 24 per frame.

The generative model 110 ingests current and previous visual temporal data 42 (i.e., data points) and outputs a sequence of predicted future visual temporal data 142. The future visual temporal data 142 is fed into a discriminative module 140, which produces a vector of probabilities indicating the likelihood that a future action or event belongs to each class among a set of classes 240 being considered. In some embodiments, a predicted class among the set of classes 240 can be determined by combining the output (e.g., vector of probabilities) of the discriminative module 140 and/or a transition matrix a transition enforcement module 320 (see FIG. 3) which contains conditional probabilities of a future action taking place given a currently observed action (e.g., visual temporal data 142).

The data acquisition module 40 may be a visual data acquisition module that comprises one or more 2D cameras or depth sensors, operating in any portion of the electromagnetic spectrum. The data acquisition module 40 captures visual information of an event or an action taking place. The data acquisition module 40 may also acquire other data modalities including but not limited to audio with a microphone or an array thereof, acceleration with an accelerometer, orientation with a gyroscope, strength of the magnetic field with a magnetometer, etc. Therefore, the data acquisition module 40 may also include a microphone, an accelerometer, a gyroscope, and/or a magnetometer. In some embodiments, the data acquisition module 40 outputs the visual temporal data 42 raw to the generative module 110, whereas in alternative embodiments, the data acquisition module 40 extracts features from the visual temporal data 42 and outputs the extracted features to the generative module 110. The extracted features can be of the hand-engineered type (e.g., histograms of colors or gradients, edge maps, deformable part models, joint locations, audio spectrograms, etc.) or learned (e.g., in an unsupervised or supervised manner via a neural network).

The generative module 110 comprises a generative statistical model that describes the underlying distribution of the visual temporal data 42 acquired by the data acquisition module 20 and generates future visual temporal data 142 from the underlying distribution of the visual temporal data 142. This generative module 110 can be implemented in the form of at least one of a Generative Adversarial Network (GAN), a Hidden Markov Model (HMM), a deep Boltzmann machine (DBM), a Gaussian Mixture Model (GMM), Auto Encoder (AE), and a Variational Auto Encoder (VAE).

Parameters (i.e., internal weights of the neural network model) of the generative module 110 are learned based on unlabeled data of the same modality as that acquired by the data acquisition module 40. The learning takes place by inputting a set of N data points (or feature representations thereof) $X_{in}=\{x_0, x_1, \ldots, x_{N-1}\}$ in a temporal sequence and adjusting the parameters of the model so that the M data point output $\hat{X}_{out}=\{\hat{x}_{N+\Delta}, \hat{x}_{n+\Delta+1}, \ldots, \hat{x}_{N+\Delta+M-1}\}$ produced by it closely matches M future data points $X_{out}=\{\hat{x}_{N+\Delta}, \hat{x}_{n+\Delta+1}, \ldots, \hat{x}_{N+\Delta+M-1}\}$ belonging to the same sequence as the N input data points, where $\Delta \geq 0$ is an integer constant.

In one embodiment, the parameters in the generative model can be adjusted in an iterative fashion. According to this embodiment, the parameters may be initialized randomly, and adjusted by taking pairs of corresponding sequences $X_{in}$ and $X_{out}$, computing $\hat{X}_{out}$ given the current value of the model parameters, computing an error or a deviation between $X_{out}$ and $\hat{X}_{out}$, and adjusting the value of the parameters so that the deviation decreases. This procedure is repeated iteratively with many different pairs of matching input and output sequences until no additional changes in the parameters is required. The determination as to whether additional changes are required or not can be made, for example, based on the magnitude of the output error (e.g., the learning can be stopped when the magnitude of the output error is below a certain threshold across a predetermined percentage of the training data samples), or on the magnitude of the changes in the model parameters (e.g., the learning can be stopped when the magnitude of the change in every model parameter is below a predetermined threshold). The adjustment in the parameter values may be driven by algorithms such as gradient descent, expectation-maximization, simulated annealing, genetic algorithms, etc.

The discriminative module 140 comprises a discriminative statistical model that, given a set of input data points (e.g., concatenated sequence $[\overline{X}_{in}, \hat{X}_{out}]$) or feature representations thereof, produces an output Y that is indicative of the class 240 (e.g, the type of action or event) to which the input data points belong. The discriminative module 140 can be implemented in the form of a fully connected neural network, a convolutional neural network, a recurrent neural network, a decision tree, a support vector machine, or similar implementation method known to one of skill in the art. In some embodiments, the output Y may be a one-hot vector with as many entries as possible observable action or event categories (i.e., one entry per action or event class), having one values on entries corresponding to categories determined to correspond) to the input data and having zero values on entries corresponding to categories determined to not correspond to the input data. For example, if there are 6 possible actions that the model can discriminate about, then the output Y is a 1×6 vector. In one example, a 1×6 vector for the output Y may be Y=[0,0,1,0,0,0], which means that category/action 3 is determined to correspond to the input data because category/action 3 is represented by a '1', while categories/actions 1,2,4,5,6 are determined to not correspond to the input data because category/actions 1,2,4,5,6 are represented by a "0".

In some embodiments, the output Y may be a probability vector with as many entries as possible observable action or event categories, where the value of each entry indicates the probability that the corresponding action or event category is being observed, as illustrated in the example 200.

The parameters of the discriminative module 140 are learned based on labeled data of the same modality as that acquired by the data acquisition module 40. The parameters of the discriminative module 140 may be learned by inputting a set of P data points (or feature representations thereof) $X_{in}=\{x_0, x_1, \ldots, x_{P-1}\}$ in a temporal sequence and adjusting the parameters of the model so that the model output $\hat{Y}$ matches the class Y of the input sequence $X_{in}$. In one embodiment, the parameters in the discriminative module 140 can be adjusted in an iterative fashion. According to this embodiment, the parameters may be initialized randomly, and adjusted by taking pairs of sequences $X_{in}$ and corresponding class labels Y, computing $\hat{Y}$ given the current value of the model parameters, computing an error or a deviation between Y and $\hat{Y}$, and adjusting the value of the parameters so that the deviation decreases. This procedure is repeated iteratively with many different pairs of matching input sequences input sequence $X_{in}$ corresponding and class labels until no additional changes in the parameters is required. The determination as to whether additional changes are required or not can be made, for example, based on the magnitude of the output error (e.g., the learning can be stopped when the magnitude of the output error is below a certain threshold across a predetermined percentage of the training data samples), or on the magnitude of the changes in the model parameters (e.g., the learning can be stopped when the magnitude of the change in every model parameter is below a predetermined threshold). The adjustment in the parameter values may be driven by algorithms such as gradient descent, expectation-maximization, simulated annealing, genetic algorithms, etc.

The predictive module 130 coordinates the operation of the generative module 110 and the discriminative modules 140 to produce an early decision as to which action or event will occur in the near future, possibly before any portion of it is observed by the data acquisition module 40. The predictive module 130 concatenates $\overline{X}_{in}$, a possibly modified version of input sequence $X_{in}$, with the output of the generative model $\hat{X}_{out}$ (e.g., future visual temporal data 142), which is indicative of estimated future samples, which may future skeletal joint values of the human 70 generated by the generative model 110. In some embodiments, the sequence $\overline{X}_{in}$, may be identical to input sequence $X_{in}$, in which case it will contain present and past data points. In other embodiments, $\overline{X}_{in}$ may contain only a subset of the samples in $X_{in}$, for instance, only the past samples, only the present samples, or more sparsely sampled samples. In yet another embodiment, $\overline{X}_{in}$ may be an empty sequence. The concatenated sequence $[\overline{X}_{in}, \hat{X}_{out}]$ thus contains estimated or predicted future samples of the event or action being monitored, and additionally may contain observed current and past samples from the action or event. The predictive module 130 inputs the concatenated sequence $[\overline{X}_{in}, \hat{X}_{out}]$ to the discriminative module 140, which makes a decision about its input sequence $X_{in}$ observed. Consequently, the output Y determined by the discriminative module 140 corresponds to an early detection or prediction of a possibly unobserved future action or event. The robot 50 of FIG. 1 may then perform an action that is complementary to the output Y determined that is the future action the human 70 will perform.

Figure 3:
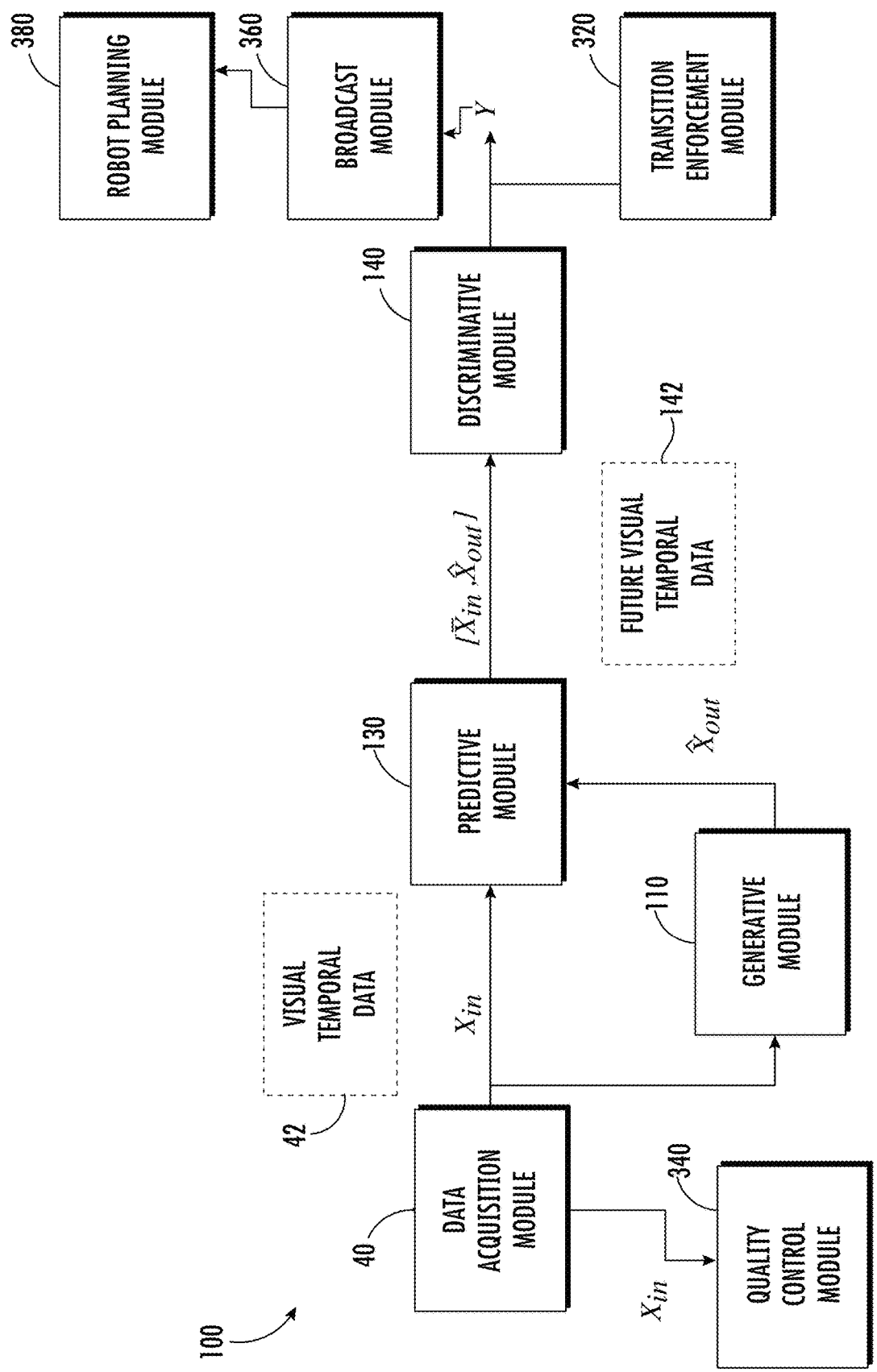
FIG. 3 is an algorithm for human-robot collaboration, in accordance with an embodiment of the disclosure.

Referring now to FIG. 3, with continued reference to FIG. 1, the algorithm 100 for human-robot collaboration is illustrated with some optional modules included, in accordance with an embodiment of the disclosure. The algorithm 100 includes the generative module 110, the predictive module 130, and the discriminative module 140. The algorithm 100 may optionally include at least one of a transition enforcement module 320, a quality control module 340, and a broadcasting module 360. It should be appreciated that, although particular systems are separately defined in the schematic block diagrams, each or any of the systems may be otherwise combined or separated via hardware and/or software.

The transition enforcement module 320 may be located after the discriminative module 140 or may be a part of the discriminative module. The transition enforcement module 320 is configured to calculate the posterior probability of an action/event by incorporating the prior probability encoded in a transition matrix. The transition enforcement module 320 represents the transition matrix for possible future actions given the previously observed action. It is possible to generate a predicted class without the transition matrix, which would be anon-informative prior or in other words a transition matrix that is composed of all uniform values.

The transition enforcement module 320 estimates a Q×Q entry state transition matrix T from previous knowledge about the action or event being observed, where Q is the number of action or event categories being considered, and computes a modified early action estimate $Y_w$ as $Y_w=Y^T T$, where $Y^T$ is the row vector representation of column vector Y, the output of the discriminative module 140. In one embodiment, T may be estimated historical data, and the (i, j)-th entry of T may correspond to the likelihood that the upcoming action or event category j is, given that the currently observed action category is i. In alternative embodiments. T may be constructed from prior knowledge about the process being observed. In some embodiments, the entries of T may be updated continuously with ongoing observations on event or action category transitions.

The quality control module 340 rates the quality of the action or the process being carried out. The quality control module 340 takes as input current and past acquired data sequence $X_{in}$, determines the action being performed and, additionally, assigns a score indicating the level of quality of the action (e.g., an individual step in a process) or the process (e.g., a set of actions). The quality control module 340 can comprise discriminative models similar to those present in the discriminative module 140, which, in addition to being able to recognize actions or events (e.g., by means of a classifier), is able to rate the quality with which the action was performed. The latter feature is enabled by the use of a regressor, which, similar to a classifier, can take the form of a fully connected neural network, a convolutional neural network, a recurrent neural network, a decision tree, a support vector machine, and the like. However, unlike the classifier, the parameters of the regressor are learned based on pairs of input sequences $X_{in}$ and a corresponding quality score S. In some embodiments, a regressor may not be explicitly trained, and the quality control module 340 may only comprise a classifier that has been trained on expertly performed actions. The quality score can then be estimated by the loss in confidence indicated by the probability vector Y. The underlying principle behind the operation is that any decrease in confidence in classifying an action that is non-expertly carried out is mainly due to deviations from protocol.

The broadcasting module 360 communicates the output Y or decision about the action or event having been detected or rated to parties involved in the process itself, or in supervising the process. In one embodiment, the broadcasting module 360 comprises an augmented reality engine that provides real-time feedback to a human operator carrying out a maintenance procedure. In another embodiment, the broadcasting module comprises a human machine interface such as a monitor or a display panel through which the early detection of an anomalous event is notified. In another embodiment, the broadcasting module 360 communicates the information on the action or event having been detected to a robot task planning module 380, which selects the robot action that best suits the estimated present (visual temporal data 42) and future human states (e.g., predicted class), where the optimality of the chosen action is measured by its degree of contribution towards the achievement of a common goal.

Figure 4:
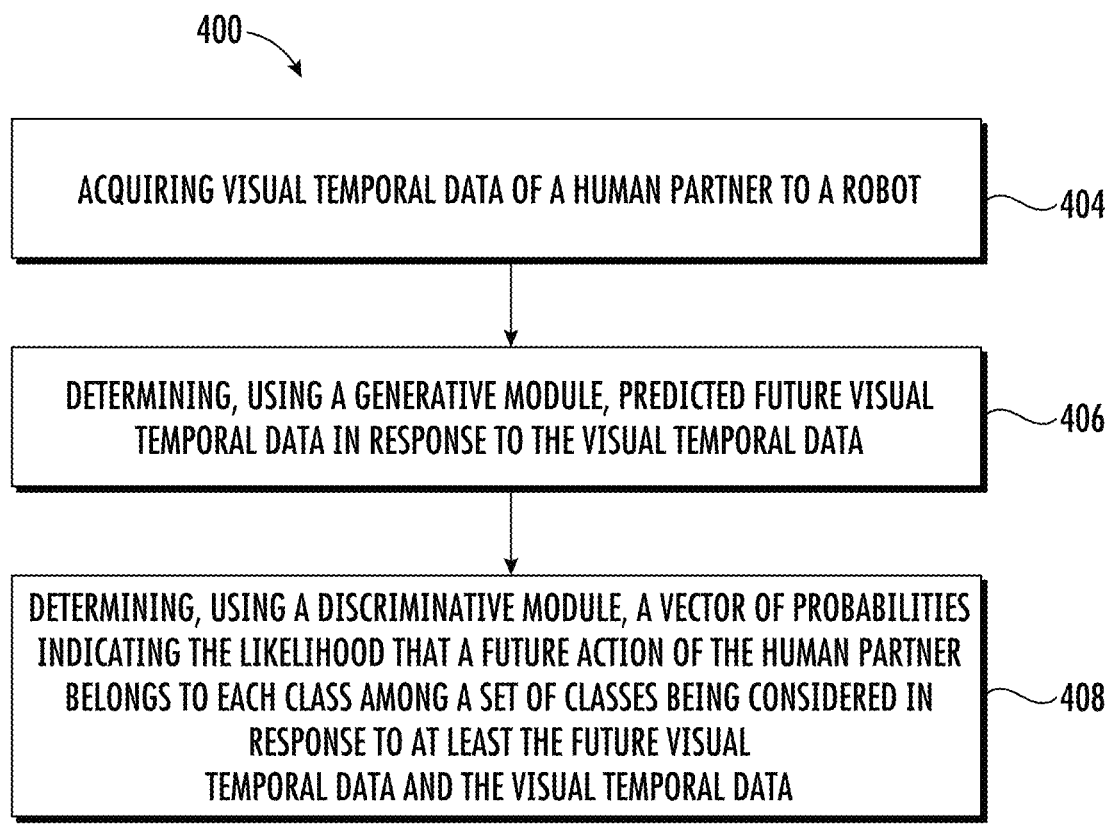
FIG. 4 is a block diagram illustrating a method for human-robot collaboration, in accordance with an embodiment of the disclosure.

Referring now to FIG. 4, with continued reference to FIGS. 1-3, a method 400 for human-robot collaboration, in accordance with an embodiment of the present disclosure. In an embodiment, the method 400 may be performed by the controller 30 of FIG. 1.

At block 404, visual temporal data 42 of a human partner 70 collaborating with a robot 50 is acquired. The visual temporal data 42 may be captured using a data acquisition module 40. At block 406, a generative module 110 determines predicted future visual temporal data 142 in response to the visual temporal data 42. A predictive module 130 may modify the visual temporal data 42 in response to the future visual temporal data. The predictive module 130 may modify the visual temporal data 42 by concatenating the predicted future visual temporal data 142 to the visual temporal data 42, and inputting the visual temporal data 42 that has been modified by the predictive module 130 to the discriminative module 140.

At block 408, a discriminative module 140 determines a vector of probabilities indicating the likelihood that a future action of the human partner belongs to each class among a set of classes being considered in response to at least the future visual temporal data and the visual temporal data. In another embodiment, the discriminative module 140 determines a vector of probabilities indicating the likelihood that a future action of the human partner belongs to each class among a set of classes being considered in response to at least the future visual temporal data and the visual temporal data that was modified by the predictive module 130.

The method 400 may also include that a transition enforcement module 320 determines a predicted class of the set of classes by combining the vector of probabilities and a transition matrix. The transition matrix contains conditional probabilities of the future action of the human partner taking place based upon the visual temporal data. The method 400 may further include that a robot planning module 380 may determine a robot action 52 that best suits the visual temporal data and the predicted class. The method 400 may also include that the robot 50 is actuated in accordance with the robot action 52.

While the above description has described the flow process of FIG. 4 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code (e.g., computer program product) containing instructions embodied in tangible media, such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the lime of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method for human-robot collaboration, the method comprising:
   acquiring visual temporal data of a human partner to a robot;
   determining, using a generative module, predicted future visual temporal data in response to the visual temporal data, the visual temporal data including current visual temporal data and previous visual temporal data; and determining, using a discriminative module, a vector of probabilities indicating the likelihood that a future action of the human partner belongs to each class among a set of classes being considered in response to at least the future visual temporal data and the visual temporal data;

modifying, using a predictive module, the visual temporal data by concatenating the predicted future visual temporal data to the visual temporal data, and inputting the visual temporal data that has been modified by the predictive module to the discriminative module;

determining, using a transition enforcement module, a predicted class of the set of classes by combining the vector of probabilities and a transition matrix, the transition matrix containing conditional probabilities of the future action of the human partner taking place based upon the visual temporal data.

2. The method of claim 1, further comprising:
determining, using a robot planning module, a robot action that best suits the visual temporal data and the predicted class.

3. The method of claim 2, further comprising:
actuating the robot in accordance with the robot action.

4. The method of claim 1, further comprising:
capturing, using a data acquisition module, visual temporal data.

5. The method of claim 4, wherein the data acquisition module comprises at least one of an external depth sensor and a Red-Green-Blue sensor.

6. The method of claim 1, wherein the visual temporal data comprises at least one of a Red-Green-Blue video, an infrared video, a near-infrared video, and depth map sequences.

7. An apparatus for human-robot collaboration, the apparatus comprising:
a controller comprising:
a processor; and
a memory comprising computer-executable instructions that, when executed by the processor, cause the processor to perform operations, the operations comprising:
acquiring visual temporal data of a human partner to a robot;
determining, using a generative module, predicted future visual temporal data in response to the visual temporal data, the visual temporal data including current visual temporal data and previous visual temporal data; and
determining, using a discriminative module, a vector of probabilities indicating the likelihood that a future action of the human partner belongs to each class among a set of classes being considered in response to at least the future visual temporal data and the visual temporal data;
modifying, using a predictive module, the visual temporal data by concatenating the predicted future visual temporal data to the visual temporal data, and inputting the visual temporal data that has been modified by the predictive module to the discriminative module;
determining, using a transition enforcement module, a predicted class of the set of classes by combining the vector of probabilities and a transition matrix, the transition matrix containing conditional probabilities of the future action of the human partner taking place based upon the visual temporal data.

8. The apparatus of claim 7, wherein the operations further comprise:
determining, using a robot planning module, a robot action that best suits the visual temporal data and the predicted class.

9. The apparatus of claim 8, wherein the operations further comprise:
actuating the robot in accordance with the robot action.

10. The apparatus of claim 7, further comprising:
a data acquisition module configured to capture the visual temporal data.

11. The apparatus of claim 10, wherein the data acquisition module comprises at least one of an external depth sensor and a Red-Green-Blue sensor.

12. The apparatus of claim 7, wherein the visual temporal data comprises at least one of a Red-Green-Blue video, an infrared video, a near-infrared video, and depth map sequences.

13. A computer program product embodied on a non-transitory computer readable medium, the computer program product including instructions that, when executed by a processor, cause the processor to perform operations comprising:
acquiring visual temporal data of a human partner to a robot;
determining, using a generative module, predicted future visual temporal data in response to the visual temporal data, the visual temporal data including current visual temporal data and previous visual temporal data; and
determining, using a discriminative module, a vector of probabilities indicating the likelihood that a future action of the human partner belongs to each class among a set of classes being considered in response to at least the future visual temporal data and the visual temporal data;
modifying, using a predictive module, the visual temporal data by concatenating the predicted future visual temporal data to the visual temporal data, and inputting the visual temporal data that has been modified by the predictive module to the discriminative module;
determining, using a transition enforcement module, a predicted class of the set of classes by combining the vector of probabilities and a transition matrix, the transition matrix containing conditional probabilities of the future action of the human partner taking place based upon the visual temporal data.

14. The computer program product of claim 13, wherein the operations further comprise:
determining, using a robot planning module, a robot action that best suits the visual temporal data and the predicted class.

15. The computer program product of claim 14, wherein the operations further comprise:
actuating the robot in accordance with the robot action.

* * * * *